UNITED STATES PATENT OFFICE.

CARL HUGO WEISE, OF POESSNICK, GERMANY.

PROCESS OF HARDENING POSITIVE MASSES OF ACCUMULATORS.

SPECIFICATION forming part of Letters Patent No. 559,155, dated April 28, 1896.

Application filed July 13, 1895. Serial No. 555,912. (No specimens.)

*To all whom it may concern:*

Be it known that I, CARL HUGO WEISE, a subject of the Duke of Saxe-Meiningen, residing at Poessnick, in the Duchy of Saxe-Meiningen and German Empire, have invented certain new and useful Improvements in Processes of Hardening the Positive Masses of Accumulators, set forth in the following specification.

The object of this invention is to produce positive plates for storage batteries of special hardness. For this purpose the previously-shaped plates of superoxid of lead are placed into a glycerin-bath, in which the plates harden, at the same time generating considerable heat and gases. If the plates are then placed while still hot into a bath of diluted sulfuric acid, (of a specific gravity of 1.15,) the hardness increases as long as gas is generated. The plates thus hardened can be shaped easily, and notwithstanding their hardness have a great capacity.

Plates that have been in use a long time and have been overtaxed and have become porous on the faces can be rehardened by this process, and then have the same durability and strength as new plates.

Having thus described my invention, what I claim, and desire to secure by Letters Patent, is—

1. The process of hardening the positive plates of storage batteries, consisting in placing the completed lead-superoxid plate into a bath of glycerin substantially as herein described.

2. The process of hardening the positive plates of storage batteries, consisting in placing the lead-superoxid plates in a bath of glycerin and then while still hot in a bath of diluted sulfuric acid, for the purpose of increasing the hardness, substantially as herein described.

In witness whereof I have hereunto set my hand in presence of two witnesses.

CARL HUGO WEISE.

Witnesses:
PEREGRINE VARNALS,
WILHELM SCHWICTHAL.